United States Patent [19]

Gelsdorf et al.

[11] 4,212,926

[45] Jul. 15, 1980

[54] PARTS SUBJECT TO WEAR WHICH COME INTO CONTACT WITH METAL MELTS

[75] Inventors: Günter Gelsdorf, Nordenstadt; Hermann Leupold, Walluf; Franz Schellberg, Wiesbaden-Frauenstein, all of Fed. Rep. of Germany

[73] Assignee: Didier-Werke AG, Wiesbaden, Fed. Rep. of Germany

[21] Appl. No.: 714,196

[22] Filed: Aug. 13, 1976

[30] Foreign Application Priority Data

May 31, 1976 [DE] Fed. Rep. of Germany ....... 2624299

[51] Int. Cl.$^2$ .......................... C04B 7/32; C04B 7/34; C04B 9/00; B32B 15/04
[52] U.S. Cl. ..................................... 428/472; 106/89; 106/97; 106/104; 106/120; 106/121; 428/404; 428/468; 428/539
[58] Field of Search ................. 106/89, 97, 104, 120, 106/121; 428/489, 468, 469, 472, 539, 404

[56] References Cited

U.S. PATENT DOCUMENTS

| | | | |
|---|---|---|---|
| 1,999,325 | 4/1935 | Borsari-Fischer | 428/489 X |
| 3,155,526 | 11/1964 | Klein | 106/89 |
| 3,505,101 | 4/1970 | Koffskey et al. | 428/469 X |
| 3,525,632 | 8/1970 | Enoch | 106/121 X |
| 3,640,754 | 2/1972 | Tauber et al. | 428/539 X |
| 3,649,316 | 3/1972 | Uno et al. | 106/89 |
| 3,784,388 | 1/1974 | King et al. | 428/469 X |
| 3,860,433 | 1/1975 | Ost et al. | 106/89 |
| 3,923,531 | 12/1975 | Parsons et al. | 106/97 X |
| 3,963,849 | 6/1976 | Thompson | 428/539 X |
| 3,995,086 | 11/1976 | Plunguian et al. | 428/539 X |
| 4,004,052 | 1/1977 | Bystrova et al. | 428/539 |
| 4,009,308 | 2/1977 | Tadashi et al. | 428/489 |
| 4,011,094 | 3/1977 | Burley | 106/89 |
| 4,011,355 | 3/1977 | Mandish et al. | 106/104 |
| 4,026,716 | 5/1977 | Urschel et al. | 106/97 |

*Primary Examiner*—Harold Ansher
*Attorney, Agent, or Firm*—Friedman, Goodman & Teitelbaum

[57] ABSTRACT

Parts subject to wear, which come into contact with metal melts, are formed with a hydraulically setting high-alumina refractory concrete having a compression strength when cold, measured on dried crude product, of at least 400 kp/cm$^2$. The compression strength is at least 700 kp/cm$^2$ after firing at 1400° C. The refractory concrete has a dimensional stability at 1400° C. of at least plus or minus 0.2%. The refractory concrete contains corundum and active alumina as aggregates, an alumina concrete containing less than 22% lime and, as required, a thinning agent. Up to 5% of the aggregates can be replaced by a spinel-forming substance preferably MgO or MgO-yielding compounds; or up to 5% of the aggregates can be replaced by carbon black, pitch or graphite; or up to 7% of the aggregates can be replaced by chromium oxide. Aggregates under 0.5 mm can be present in the refractory concrete as round grains. Preferably, the refractory concrete is used for slide-valve plates and/or base plates of slide-valve closure members on containers containing steel melts. The moulded parts can be impregnated with tar.

8 Claims, No Drawings

PARTS SUBJECT TO WEAR WHICH COME INTO CONTACT WITH METAL MELTS

The invention relates to parts subject to wear coming into contact with metal melts. The parts are e.g. plugs or sleeves, more particularly plates for valve closure means on containers containing steel melts.

As a rule, parts subject to wear are parts which, after reaching a wear limit, must always be renewed or replaced so as not to impair the safety of the units in which they operate. They are often exposed to high thermal and chemical corrosion and possibly erosion, and in many cases also have to withstand considerable stress. For example, in the case of plates for slide valve closure means, the slide-valve plate must remain easily movable and provide a reliable seal, in spite of changes in shape to which the refractory plate material is subject, owing to unavoidable differences in temperature, and the pair of plates must, during at least one container-emptying operation, withstand thermal and chemical corrosion and erosion by the melt flowing through them, the cross-section of the cast jet being adjustable.

Hitherto, parts subject to wear of this kind have been made of high-quality dry, half-dry or plastic refractory composite materials in relatively expensive ramming, jarring and pressing processes followed by relatively expensive treatment. Precisely-fitting parts subject to wear have to be heat-treated at exactly regulated temperatures and for exact times and must then be carefully machined.

In the case of plates in slide-valve closure means, the surfaces which must cooperate in a sealing-tight manner with other surfaces while remaining easily adjustable must be ground extremely flat. Bores, grooves or the like are also frequently formed by machining, so that it is expensive to manufacture parts subject to wear which must be precise-fitting and need mechanical treatment.

An object of the present invention is to simplify the manufacture of refractory parts subject to wear by using refractory concrete which fulfills certain conditions and which also opens up new applications, which have been avoided by experts owing to the unforeseeable risks.

The invention is based on the fact that experts have not seen any point in using concrete moulded members, e.g. as refractory closure plates at the outlet of a container for casting steel, mainly because of the extreme stresses caused by the outflowing melt, i.e. sudden temperature shocks and a strong erosive washing effect of the cast jet, which may be up to 120 mm thick.

The problem according to the invention is solved by using a hydraulically setting high-alumina refractory concrete having a compressive strength when cold, measured on the dried crude product, of at least 400 kp/cm$^2$, rising to at least 700 kp/cm$^2$ after firing at 1400° C., and adimensional stability at 1400° C. of at least ±0.2% for parts subject to wear coming into contact with metal melts, more particularly for the slide-valve plate and/or base-plate of slide-valve closure members on containers containing steel melts.

The result is a considerable simplification in manufacture, particularly of pairs of plates for slide-valve closure means, since when concrete is poured into a mould it exactly follows the shape of the mould surfaces and, if the surfaces are smooth and clean, they produce smooth, clean matching surfaces on the moulded member. Consequently, the sliding surfaces of slide-valve plates can be manufactured very accurately during the actual moulding operation, thus avoiding the need for lengthy mechanical after-treatment. In addition, the flow apertures can be formed during moulding, after which the plates can be taken out ready for use.

The high-alumina concrete having the aforementioned physical properties can be used to ensure that parts subject to wear manufactured therefrom are safe in operation, even when highly stressed by heat, chemical corrosion and erosion. Very advantageously, the refractory concrete is mixed with corundum and active alumina as aggregates and contains less than 15% alumina cement containing not more than 22% lime, a thinning agent being added if necessary, and the material comprising preferably at least 96% $Al_2O_3$, less than 3% CaO and less than 0.5% SiO. The high content of $Al_2O_3$ has an advantageous effect on the resistance of the concrete moulding to changes in temperature. The resistance to changes in temperatures is also advantageously influenced by the total porosity, which is between 23 and 27 vol. % of exclusively open pores, which e.g. are the most suitable for impregnation with tar.

In the case of the aggregates (corundum and active alumina), the alumina content is advantageously between 5 and 15% . According to another feature of the invention, it may be particularly advantageous, for certain applications, to replace 1 to 5% of the aggregates by a spinel-forming substance, preferably MgO or MgO-yielding compounds. At about 1000° C., the magnesia in the concrete reacts with the decomposition products from the dehydrated binder to form spinel, MgO, $Al_2O_3$. The concrete structure thus becomes stronger and denser and therefore also more resistant to the infiltration of steel melts and corrosion by slag, since the spinel has already formed when the slag appears in the steel bath. MgO can be replaced by NiO, CoO, or ZnO or compounds yielding these oxides.

If required, the resistance of the moulding to slag can be further increased by adding up to 5% carbon black or graphite.

In many cases, it is advantageous to replace up to 7% of the aggregates by chromium oxide, so as to counteract the wetting of the moulding by liquid melts or slag. Advantageously, the aggregates below 0.5 mm are present in the form of round grains, which also has an advantageous effect on the strength of the moulding.

The manufacture of a refractory part subject to wear will not be described with reference to a Table showing mixtures, particle sizes and properties of five refractory concretes according to the invention.

Concrete in accordance with items 1–5 was poured and vibrated in a mould corresponding in shape to a slide-valve plate. The subsequent setting and hardening lasted 12 hours. After release from the mould, the plate was left for 48 hours at room temperature and was then dried at 110° C., thus terminating the manufacturing process.

In order to test the strength at higher temperatures, the plate was first heat-treated at 600° C., then cooled, after which the compressive strength when cold was measured. The process was repeated at 1400° C.

The percentage contraction after firing at 1400° C., as given in the Table, is identical with the dimensional stability of the refractory concrete as required according to the invention.

The suitability of a refractory concrete for parts resistant to wear, more particularly for the pair of plates of slide-valve closure means, can also be judged from the Peeling test. This combines the following conditions:

An area about 30 mm in diameter on a plate measuring 100×100 mm with a smooth (ground) surface is heated with an oxyacetylene welding torch capable of burning through metal plates between 20 mm and 30 mm thick. The oxygen pressure is 2.5 atm. gauge and the acetylene-gas pressure is 0.5 atm. gauge. The distance of the plate from the burner nozzle, which is held by a stand, is 50 mm and the test lasts for 15 sec.

If no splintering occurs, the material is very suitable for manufacturing pairs of plates for slide-valve closure means. The material can be used if particles come loose, when the test-piece is subsequently scratched, but is useless if splintering occurs during the test.

| Example | | | | 1 | 2 | 3 | 4 | 5 |
|---|---|---|---|---|---|---|---|---|
| Sintered corundum containing 99% $Al_2O_3$ | | 3,15-6 | mm | 17,50 | 17,50 | 17,50 | 17,50 | 17,50 |
| | | 1-3,15 | mm | 22,50 | 22,50 | 22,50 | 22,50 | 22,50 |
| | | 0,5-1 | mm | 7,50 | 7,50 | 7,50 | 7,50 | 7,50 |
| | | 0,09-0,5 | mm | 12,50 | 12,50 | 12,50 | 12,50 | 12,50 |
| | | <0,09 | mm | 21,00 | 16,00 | 21,00 | 15,00 | 16,00 |
| Chromium oxide | | <0,09 | mm | — | 5,00 | — | — | — |
| Active alumina | | <0,09 | mm | 9,00 | 9,00 | 5,00 | 11,00 | 9,00 |
| Alumina cement containing 80% $Al_2O_3$ and 19% CaO | | — | | 9,95 | 9,95 | 9,95 | 13,95 | 9,95 |
| Thinning agent (liquifying agent) for alumina cement (Polyelektrolyt) | | — | | 0,05 | 0,05 | 0,05 | 0,05 | 0,05 |
| MgO | | <0,09 | mm | — | — | 4,00 | — | — |
| Graphite powder | | <0,09 | mm | — | — | — | — | 5,00 |
| | | | % | 100,00 | 100,00 | 100,00 | 100,00 | 100,00 |
| Added water (l/100 kg dry material) | | | | 5,5 | 6,0 | 6,0 | 5,0 | 6,0 |
| Compressive strength when cold (kp/cm$^2$) | | | | | | | | |
| after drying at 110° C. | | | | 1000 | 720 | 550 | 1200 | 630 |
| after heat treatment at 600° C. | | | | 1000 | 720 | 660 | 1200 | 560 * |
| after firing at 1400° C. | | | | 1100 | 810 | 1200 | 1300 | 1060 * |
| Total porosity after heat treatment at 600° C. (vol. −%) | | | | 24 | 22 | 23 | 23 | 27 * |
| Contraction after firing at 1400° C. (%) | | | | +0,1 | +0,2 | −0,1 | +0,1 | +0,1 * |

* = Reduced firing

What is claimed is:

1. Parts subject to wear which come into contact with a metal melt, said parts comprising means for contacting a steel melt and withstanding stresses caused by said steel melt, said means including a hydraulically setting high-alumina refractory concrete, said refractory concrete having following physical properties:
   (a) a compression strength of at least 400 kp/cm$^2$ as measured cold on a dried crude product;
   (b) a compression strength of at least 700 kp/cm$^2$ after firing at 1400° C.; and
   (c) a dimensional stability of at least ±0.2% at said 1400° C.

2. Parts subject to wear according to claim 1, characterized in that aggregates under 0.5 mm are present is said refractory concrete as round grains.

3. Parts subject to wear according to claim 1, characterized in that said parts are moulded parts impregnated with tar.

4. Parts subject to wear according to claim 1, wherein said parts include slide-valve closure means for a container containing said steel melt, said closure means including slide-valve plates.

5. Parts subject to wear as claimed in claim 1, wherein said refractory concrete contains corundum and active alumina as aggregates, an hydraulic alumina-cement containing less then 22% lime and, as required, a thinning agent to provide a composition having at least 96% $Al_2O_3$, less than 3% CaO and less than 0.5% $SiO_2$.

6. Parts subject to wear according to claim 2, wherein said aggregates are in a mixture with up to 5% of said mixture being a spinel-forming substance, wherein said spinel-forming substance is MgO or MgO-yielding compounds.

7. Parts subject to wear according to claim 2, wherein said aggregates are in a mixture, wherein up to 5% of said mixture is carbon black, pitch or graphite.

8. Parts subject to wear according to claim 2, wherein said aggregates are in a mixture, wherein up to 7% of said aggregate mixture is chromium oxide.

* * * * *